INVENTOR
ARNOLD E. BECKER
BY Dick & Zarley
ATTORNEYS

United States Patent Office 3,285,552
Patented Nov. 15, 1966

3,285,552
PIPE SUPPORT
Arnold E. Becker, 214 Julie Court, Waterloo, Iowa
Filed Feb. 8, 1965, Ser. No. 430,820
9 Claims. (Cl. 248—68)

This invention relates to a pipe support or hanger and more particularly to a pipe support for supporting water pipes in a building or the like.

The water pipes which supply water to lavatories, sinks, etc. in a building are usually positioned in the walls thereof. These water pipes are generally positioned adjacent an associated waste pipe which is usually larger and stronger than the water pipes. For convenience, the water pipes are supported by securing them to the stronger waste pipe. This connection is usually accomplished by (1) soldering a length of tubing between the water pipes and the waste pipe; (2) securing a board to the waste pipe and securing the water pipes to the board or (3) merely extending a length of wire around the waste pipe and water pipes. These methods produce unsatisfactory results at best and are extremely time consuming due to the makeshift methods employed. Method (1) permits heat transfer from the hot water pipe to the cold water pipe and/or waste pipe. Method (1) also permits electrolysis of the pipes due to the flow of electrical current therebetween. Method (2) does not provide a sturdy support and is extremely time consuming to install. Method (2) also results in a somewhat shoddy appearing finished product. Method (3) is unsatisfactory for all of the reasons listed above.

Therefore, it is a principal object of this invention to provide a pipe support.

A further object of this invention is to provide a pipe support for supporting water pipes in a building or the like.

A further object of this invention is to provide a pipe support which permits the water pipes to be quickly and easily connected to a waste pipe.

A further object of this invention is to provide a pipe support which permits selective movement of the water pipe with respect to the waste pipe.

A further object of this invention is to provide a pipe support which prevents heat transfer from one pipe to the other.

A further object of this invention is to provide a pipe support which prevents electrolysis of the respective pipes.

A further object of this invention is to provide a pipe support which may be secured to any side of a waste pipe.

A further object of this invention is to provide a pipe support which prevents horizontal as well as vertical movement of the water pipes with respect to the waste pipe.

A still further object of this invention is to provide a pipe support which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

Figure 1:
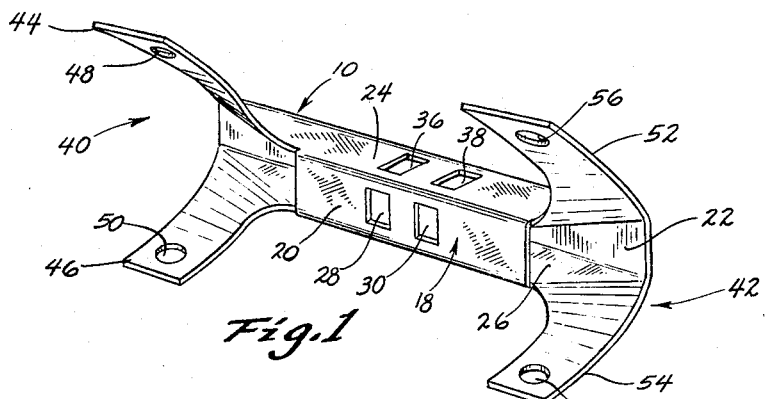
FIG. 1 is a perspective view of the device.

The pipe support is generally indicated by the reference numeral 10 while the numeral 12 refers to a vertical waste pipe or the like and the numerals 14 and 16 indicate vertical water pipes or the like.

Pipe support 10 includes a rigid, elongated, hollow body portion 18 which is substantially square in cross-section and has front and back vertical wall members 20 and 22 respectively, and top and bottom horizontal wall members 24 and 26 respectively. Front wall 20 is provided with spaced apart openings 28 and 30 formed therein which are spaced substantially equally distantly from the center of front wall 20. Back wall 22 is provided with spaced apart openings 32 and 34 formed therein which are spaced substantially equidistantly outwardly from the center of back wall 22. Top wall 24 is provided with spaced apart openings 36 and 38 formed therein which are spaced substantially equidistantly from the center of top wall 24.

Figures 3, 4:
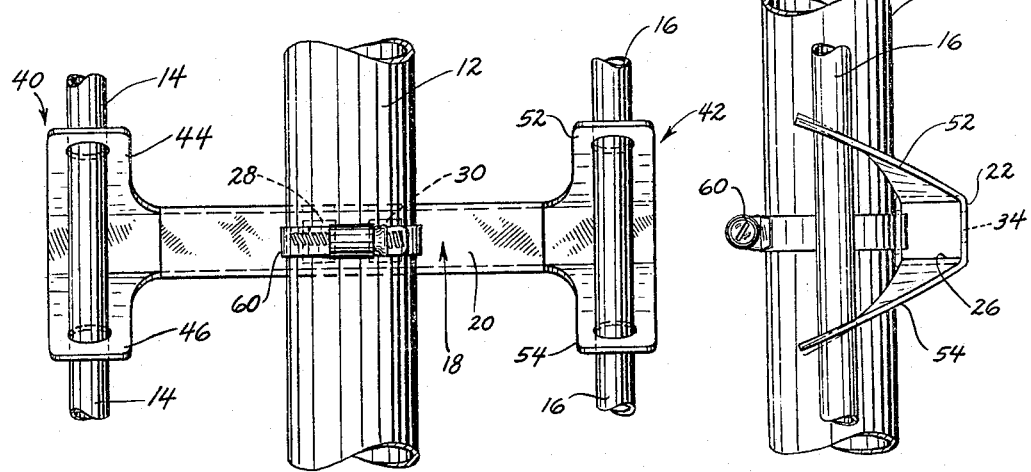
FIG. 3 is a front elevational view of the device mounted on a vertical pipe and supporting a pair of vertical pipes.
FIG. 4 is a side elevational view of the device as viewed from the right in FIG. 3.

As seen in the drawings, pipe support 10 has a pair of flexible pipe gripping means 40 and 42 at its opposite ends. Pipe gripping means 40 includes upper and lower tabs 44 and 46 respectively having holes 48 and 50 formed therein respectively. As best seen in FIGS. 1 and 3, tab 44 extends upwardly and outwardly from body portion 18 while tab 46 extends downwardly and outwardly from body portion 18. Pipe gripping means 42 includes upper and lower tabs 52 and 54 respectively having holes 56 and 58 formed therein respectively. As best seen in FIGS. 1, 3 and 4, tab 52 extends upwardly and outwardly from body portion 18 while tab 54 extends downwardly and outwardly from body portion 18.

The numeral 60 generally designates a conventional adjustable clamp which is adapted to be selectively extended through any pair of holes in either walls 20, 22 or 24 and to frictionally engage a member having a circular cross-section.

Preferably, pipe support 10 is constructed of a plastic which provides sufficient strength to body portion 18 but yet permits tabs 44, 46 and tabs 52, 56 to be easily moved towards or away from each other respectively.

Figure 2:
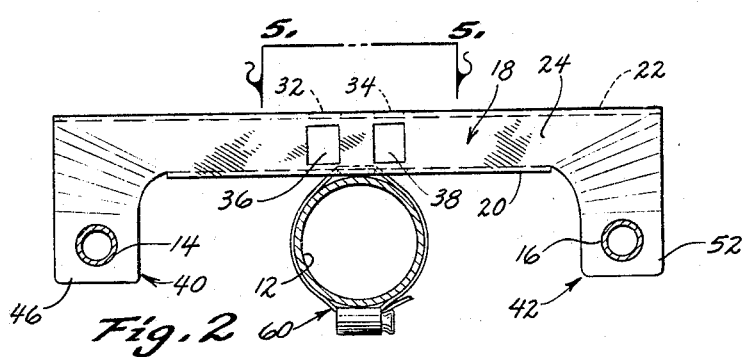
FIG. 2 is a top elevational view of the device mounted on a vertical pipe and supporting a pair of vertical pipes.
Figure 5:
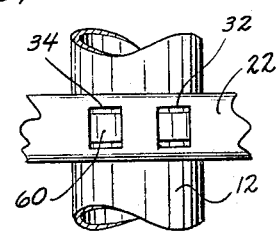
FIG. 5 is a back elevational view of the device as seen on line 5—5 of FIG. 2.

The normal method of operation is as follows: The vertical waste pipe 12 is normally installed in the building wall prior to the installation of water pipes 14 and 16. In order to support pipes 14 and 16 in the orientation seen in the drawings, it is simply necessary to extend the band portion of clamp 60 through openings 28 and 32 such as illustrated in FIG. 2. Clamp 60 is then extended around pipe 12 and tightened thereon.

Inasmuch as pipe gripping means 40 and 42 perform the same functions, only the operation of gripping means 40 will be described. Tabs 44 and 46 are simply squeezed together by hand until they are substantially horizontally disposed. Pipe 14 is then extended through holes 48 and 50. When pipe 14 is positioned correctly, tab 44 is bent or moved upwardly to the position shown in the drawings and tab 46 is bent or moved downwardly to the position shown in the drawings. The frictional engagement of tabs 44 and 46 at their respective openings 48 and 50 supports pipe 14 from any objectionable movement. Tab 46 prevents any downward movement of pipe 14 with respect to pipe 12 while tab 44 prevents any upward movement of pipe 14 with respect to pipe 12. Tabs 44 and 46 act in conjunction with each other to prevent any horizontal movement of pipe 14 with respect to pipe 12. Thus it can be appreciated that pipe 14 is securely held in position.

Clamp 60 can also be inserted through openings 32 and 34 if it is desired to position pipes 14 and 16 in a vertical plane forwardly of pipe 12. In this position, back wall 22 of pipe support 10 would be positioned adjacent pipe 12 and pipe support 10 would be forwardly of pipe 12.

Pipe support 10 can also be used if waste pipe 12 is horizontally disposed by the insertion of clamp 60 through openings 36 and 38.

Pipe support 10, due to its plastic construction, prevents heat transfer between the pipes. The non-conductive properties of pipe support 10 also prevents any electrolysis from occurring. Pipe support 10 is quickly and easily installed and presents a neat appearing workpiece. It can be appreciated that pipe support 10 could be constructed of any size to fit the needs of the particular plumbing contractor.

Thus it can be seen that the device accomplishes at least all of its stated objectives.

Some changes may be made in the construction and arrangement of my pipe support without departing from the real spirit and purpose of my invention, and it is my intention to cover by my claims, any modified forms of structure or use of mechanical equivalents which may be reasonably included within their scope.

I claim:

1. In a support for pipes,
    an elongated member having a first pipe gripping means at one of its ends and a second pipe gripping means at its other end,
    a means on said elongated member for detachably securing said elongated member to a first pipe,
    said first and second pipe gripping means for gripping second and third pipes respectively to prevent movement of said second and third pipes with respect to said first pipe.

2. The support of claim 1 wherein said first and second gripping means are each movable between gripping and non-gripping positions to permit selective movement of second and third pipes with respect to a first pipe member.

3. The support of claim 1 wherein said first and second gripping means are each comprised of spaced apart flexible tab portions having an opening formed therein; the second pipe adapted to extend through the openings in the tab portions of said first pipe gripping means and said third pipe adapted to extend through said openings in said tab portions of said second pipe gripping means.

4. The support of claim 1 wherein said first and second gripping means are each comprised of spaced apart flexible tab portions having an opening formed therein; the second pipe adapted to extend through the openings in the tab portions of said first pipe gripping means and said third pipe adapted to extend through said openings in said tab portions of said second pipe gripping means; one of said tab portions of each of said first and second pipe gripping means limiting movement of the second and third pipes respectively in one direction with respect to the first pipe, the other of said tab portions of each of said first and second pipe gripping means limiting movement of the second and third pipes respectively in a direction opposite to said one direction.

5. The support of claim 1 wherein said elongated member is composed of a material having low electrical conductive properties.

6. The support of claim 1 wherein said elongated member is composed of a material having low thermal conductive properties.

7. The support of claim 1 wherein said elongated member and said first and second pipe gripping means are comprised of plastic.

8. In a support for pipes,
    an elongated hollow member having vertical front and back walls and horizontal top and bottom walls,
    at least said front wall having a pair of spaced apart openings formed therein which are adapted to receive a clamp means extending therethrough for securing said elongated hollow member to a first pipe,
    said elongated, hollow member having a first pipe gripping means at one of its ends and a second pipe gripping means at its other end,
    said first and second pipe gripping means adapted to grip second and third pipes respectively to prevent movement of said second and third pipes with respect to said first pipe.

9. In a support for pipes,
    an elongated hollow member having vertical front and back walls and horizontal top and bottom walls,
    at least one of said front and back walls and at least one of said top and bottom walls each having a pair of spaced apart openings formed therein which are each adapted to receive a clamp means extending therethrough for securing said elongated hollow member to a first pipe,
    said elongated member having a pair of spaced apart table at each of its ends normally extending forwardly therefrom at substantially a right angle to said front wall,
    said tabs at one end of said elongated member each having openings formed therein adapted to frictionally receive a second pipe extending therethrough,
    said tabs at the other end of said elongated hollow member each having openings formed therein adapted to frictionally receive a third pipe extending therethrough,
    the longitudinal axis of said first pipe being substantially parallel to the longitudinal axes of said second and third pipes when said clamp means extends through said openings in said top wall,
    the longitudinal axis of said first pipe being substantially parallel to the longitudinal axes of said second and third pipes when said clamp means extends through a pair of openings in one of said front and back walls.

References Cited by the Examiner

UNITED STATES PATENTS

| 2,961,479 | 11/1960 | Bartling | 174—43 |
| 3,154,276 | 10/1964 | Havener | 248—73 |
| 3,180,597 | 4/1965 | Havener | 248—68 |

FOREIGN PATENTS

| 178,697 | 3/1962 | Sweden. |
| 179,042 | 4/1962 | Sweden. |

CLAUDE A. LE ROY, *Primary Examiner.*